(12) United States Patent
Jeon et al.

(10) Patent No.: US 7,804,480 B2
(45) Date of Patent: Sep. 28, 2010

(54) HYBRID BACKLIGHT DRIVING APPARATUS FOR LIQUID CRYSTAL DISPLAY

(75) Inventors: Jin Hwan Jeon, Suwon-Si (KR); Hoon Jang, Seoul (KR)

(73) Assignee: LG Display Co., Ltd., Seoul (KR)

( * ) Notice: Subject to any disclaimer, the term of this patent is extended or adjusted under 35 U.S.C. 154(b) by 1143 days.

(21) Appl. No.: 11/450,433

(22) Filed: Jun. 12, 2006

(65) Prior Publication Data
US 2007/0146565 A1 Jun. 28, 2007

(30) Foreign Application Priority Data
Dec. 27, 2005 (KR) .................. 10-2005-0130814

(51) Int. Cl.
*G09G 3/36* (2006.01)
*G02F 1/1335* (2006.01)
(52) U.S. Cl. .................. 345/102; 345/87; 349/61
(58) Field of Classification Search ............ 345/87–90, 345/102; 349/61–71
See application file for complete search history.

(56) References Cited

U.S. PATENT DOCUMENTS 7,332,897 B2 * 2/2008 Lee et al. ............... 323/222

FOREIGN PATENT DOCUMENTS

| JP | 10-92589 A | 4/1998 |
|---|---|---|
| JP | 2000-58289 A | 2/2000 |
| JP | 2003-264090 A | 9/2003 |
| JP | 2004-20975 A | 1/2004 |
| JP | 2004-139876 A | 5/2004 |
| JP | 2005-203347 A | 7/2005 |

* cited by examiner

*Primary Examiner*—Srilakshmi K Kumar
(74) *Attorney, Agent, or Firm*—Birch, Stewart, Kolasch & Birch, LLP

(57) ABSTRACT

A hybrid backlight driving apparatus for a liquid crystal display device for driving a backlight assembly is provided. The hybrid backlight assembly has a plurality of lamps and a plurality of light emitting diodes. The hybrid backlight driving apparatus, as embodied, includes: a lamp inverter for converting a first DC voltage into a lamp driving voltage and supplying the lamp driving voltage to the plurality of lamps; and a light emitting diode driver for converting the first DC voltage into a light emitting diode driving voltage and supplying the light emitting diode driving voltage to the plurality of light emitting diodes.

29 Claims, 12 Drawing Sheets

HYBRID BACKLIGHT DRIVING APPARATUS FOR LIQUID CRYSTAL DISPLAY

This Nonprovisional Application claims priority under 35 U.S.C. §119(a) on Patent Application No. 10-2005-130814 filed in Korea on Dec. 27, 2005, the entire contents of which are hereby incorporated by reference.

BACKGROUND OF THE INVENTION

1. Field of the Invention

This invention relates to a liquid crystal display, and more particularly to a hybrid backlight driving apparatus for a liquid crystal display wherein a high voltage can be converted into a driving voltage of a hybrid backlight to be supplied to lamps and light emitting diodes of the liquid crystal display.

2. Description of the Related Art

Generally, a liquid crystal display (LCD) controls light transmittance of liquid crystal cells in accordance with video signals to thereby display a picture. An active matrix type liquid crystal display device having a switching device provided for each liquid crystal cell is advantageous for displaying moving pictures because it permits an active control of the switching device. The switching device used for the active matrix liquid crystal display device mainly employs a thin film transistor (TFT) as shown in FIG. 1.

Figure 1:
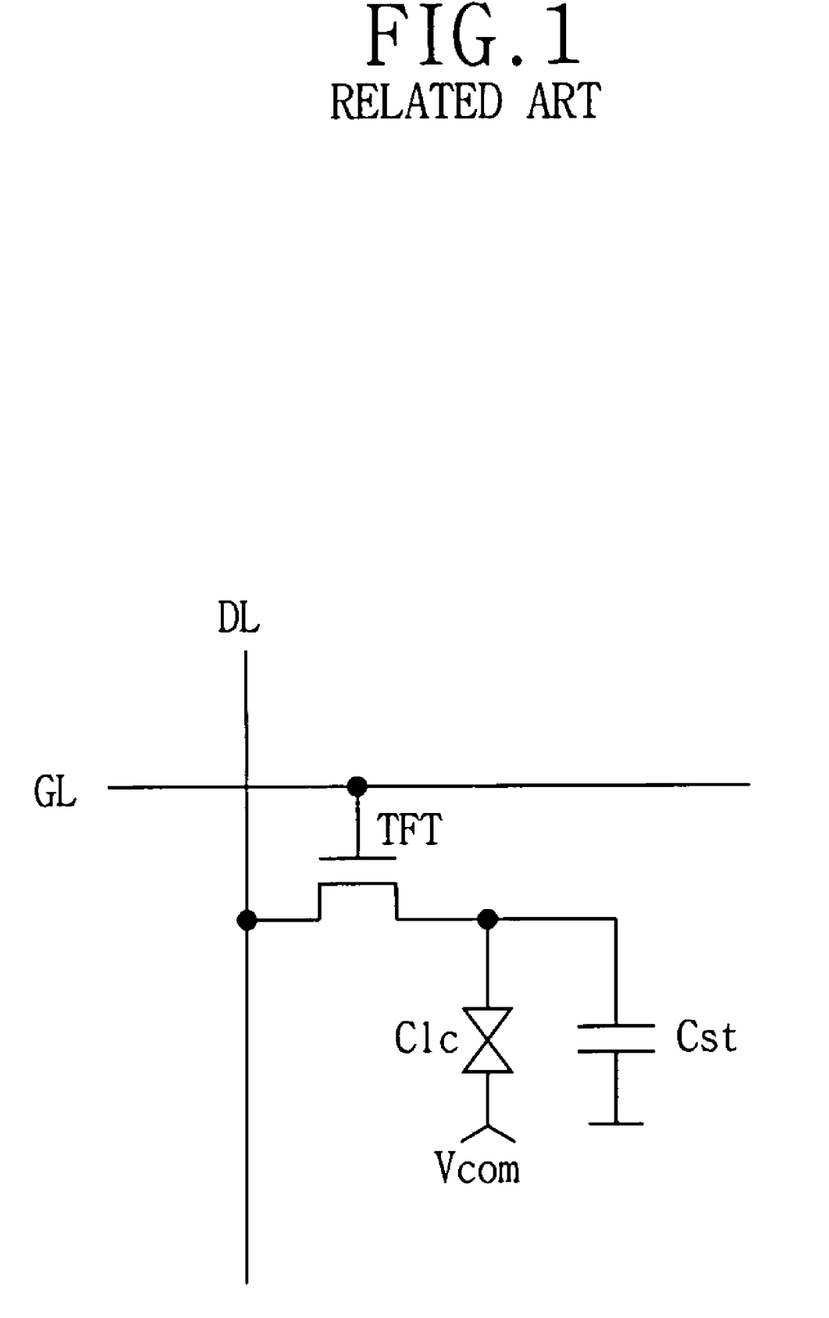
FIG. 1 is an equivalent circuit diagram of a pixel provided at a general liquid crystal display device.

Referring to FIG. 1, the active matrix LCD converts a digital input data into an analog data voltage on the basis of a gamma reference voltage to supply it to a data line DL and, at the same time, supplies a scanning pulse to a gate line GL to thereby charge a liquid crystal cell Clc.

A gate electrode of the TFT is connected to the gate line GL while a source electrode thereof is connected to the data line DL. Further, a drain electrode of the TFT is connected to a pixel electrode of the liquid crystal cell Clc and to one electrode of a storage capacitor Cst. A common electrode of the liquid crystal cell Clc is supplied with a common voltage Vcom.

The storage capacitor Cst plays a role in charging a data voltage fed from the data line DL when the TFT is turned on, thereby constantly keeping a voltage at the liquid crystal cell Clc.

If the scanning pulse is applied to the gate line GL, then the TFT is turned on to provide a channel between the source electrode and the drain electrode thereof, thereby supplying a voltage on the data line DL to the pixel electrode of the liquid crystal cell Clc. Therefore, liquid crystal molecules of the liquid crystal cell change the alignment direction due to an electric field between the pixel electrode and the common electrode to thereby modulate an incident light.

Figure 2:
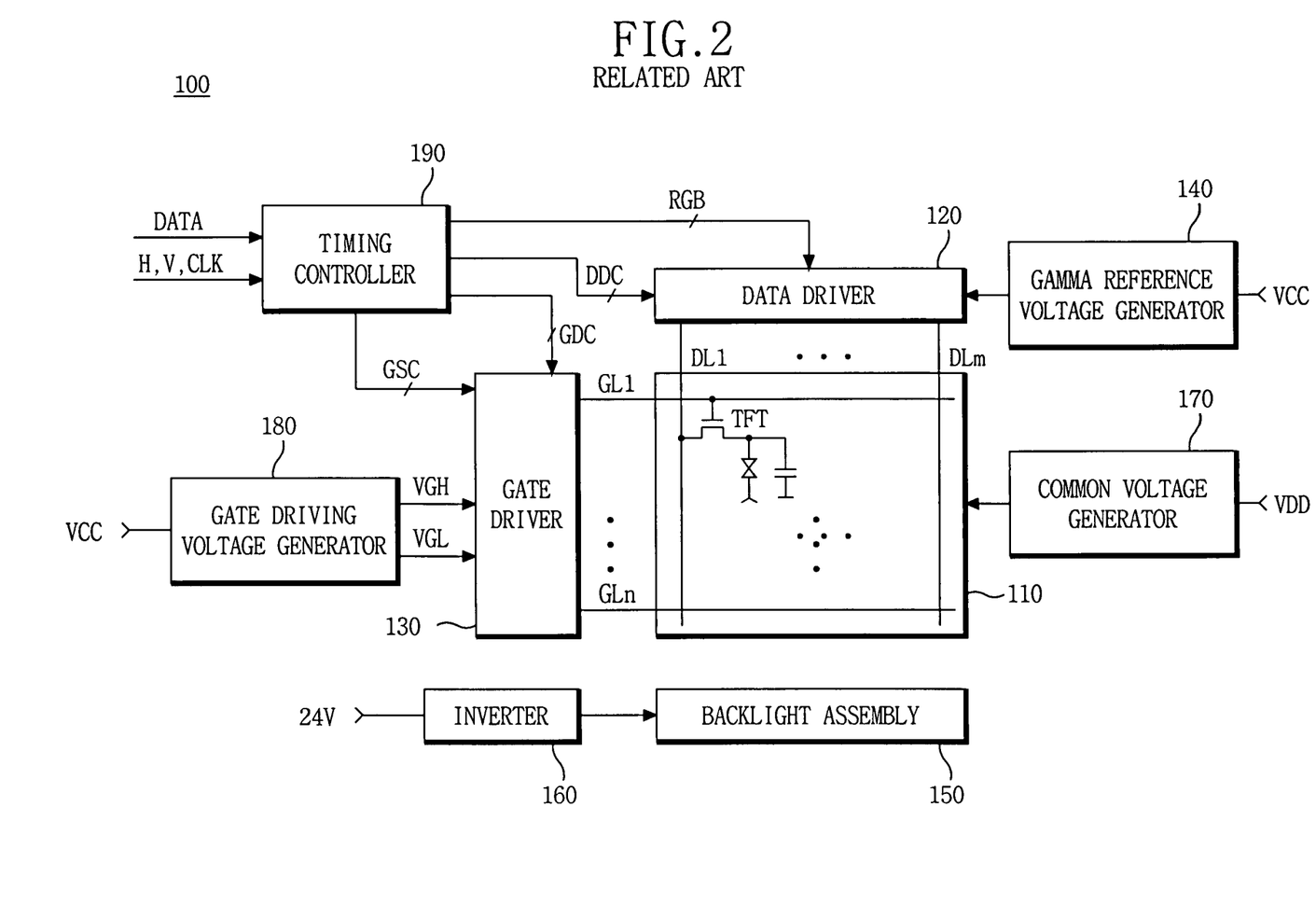
FIG. 2 is a block diagram showing a configuration of a related art liquid crystal display device.

A configuration of the related art LCD including pixels having the above-mentioned structure will be described with reference to FIG. 2. FIG. 2 is a block diagram showing a configuration of a general liquid crystal display device. Referring to FIG. 2, a general liquid crystal display device 100 includes a liquid crystal display panel 110 provided with thin film transistors (TFTs) for driving the liquid crystal cell Clc at an intersection of data lines DL1 to DLm and gate lines GL1 to GLn crossing each other, a data driver 120 for supplying a data to the data lines DL1 to DLm of the liquid crystal display panel 110, a gate driver 130 for supplying a scanning pulse to the gate lines GL1 to GLn of the liquid crystal display panel 110, a gamma reference voltage generator 140 for generating a gamma reference voltage to supply it to the data driver 120, a backlight assembly 150 for irradiating a light onto the liquid crystal display panel 110, an inverter 160 for applying AC voltage and current to the backlight assembly 160, a common voltage generator 170 for generating a common voltage Vcom and supplying them to the common electrode of the liquid crystal cell Clc of the liquid crystal display panel 110, a gate driving voltage generator 180 for generating a gate high voltage VGH and a gate low voltage VGL and supplying them to the gate driver 130, and a timing controller 190 for controlling the data driver 120 and the gate driver 130.

The liquid crystal display panel 110 has a liquid crystal injected between two glass substrates. On the lower glass substrate of the liquid crystal display panel 110, the data lines DL1 to DLm and the gate lines GL1 to GLn perpendicularly cross each other. Each intersection between the data lines DL1 to DLm and the gate lines GL1 to GLn is provided with the TFT. The TFT supplies data on the data lines DL1 to DLm to the liquid crystal cell Clc in response to the scanning pulse. The gate electrode of the TFT is connected to the gate lines GL1 to GLn while the source electrode thereof is connected to the data line DL1 to DLm. Further, the drain electrode of the TFT is connected to the pixel electrode of the liquid crystal cell Clc and to the storage capacitor Cst.

The TFT is turned on in response to the applied scanning pulse, via the gate lines GL1 to GLn, to the gate terminal thereof. Upon turning-on of the TFT, the video data on the data lines DL1 to DLm are supplied to the pixel electrode of the liquid crystal cell Clc.

The data driver 120 supplies the data to the data lines DL1 to DLm in response to a data driving control signal DDC from the timing controller 190. Further, the data driver 120 samples and latches the digital video data RGB fed from the timing controller 190, and then converts the digital video data RGB into an analog data voltage capable of expressing a gray scale level at the liquid crystal cell Clc of the liquid crystal display panel 110 based on a gamma reference voltage from the gamma reference voltage generator 140, thereby supplying it to the data lines DL1 to DLm.

The gate driver 130 sequentially generates a scanning pulse, that is, a gate pulse in response to a gate driving control signal GDC and a gate shift clock GSC from the timing controller 190 and supplies them to the gate lines GL1 to GLn. The gate driver 130 determines a high level voltage and a low level voltage of the scanning pulse in accordance with the gate high voltage VGH and the gate low voltage VGL from the gate driving voltage generator 180.

The gamma reference voltage generator 140 receives a highest-level power voltage VDD supplied to the liquid crystal display panel 110 to thereby generate a positive gamma reference voltage and a negative gamma reference voltage, and outputs them to the data driver 120.

The backlight assembly 150 is provided at the rear side of the liquid crystal display panel 110, and is radiated by alternating current (AC) voltage and current supplied to the inverter 160 to irradiate a light onto each pixel of the liquid crystal display panel 110.

The inverter 160 converts a rectangular wave signal generated at the interior thereof into a triangular wave signal and then compares the triangular wave signal with a direct current (DC) power voltage Vcc supplied from said system, thereby generating a burst dimming signal proportional to a result of the comparison. If the burst dimming signal is determined in accordance with the rectangular wave signal at the interior of the inverter 160, then a driving integrated circuit (IC) for controlling the generation of the AC voltage and current within the inverter 160 controls the generation of AC voltage and current supplied to the backlight assembly 150 in response to the burst dimming signal.

The common voltage generator 170 receives a high-level power voltage VDD to generate a common voltage Vcom, and supplies it to the common electrode of the liquid crystal cell Clc provided at each pixel of the liquid crystal display panel 110.

The gate driving voltage generator 180 is supplied with a high-level power voltage VDD to generate the gate high voltage VGH and the gate low voltage VGL, and supplies them to the data driver 130. Herein, the gate driving voltage generator 180 generates a gate high voltage VGH higher than a threshold voltage of the TFT provided at each pixel of the liquid crystal display panel 110 and a gate low voltage VGL lower than the threshold voltage of the TFT. The gate high voltage VGH and the gate low voltage VGL generated in this manner are used for determining a high level voltage and a low level voltage of the scanning pulse generated by the gate driver 130, respectively.

The timing controller 190 supplies the digital video data RGB from a digital video card (not shown) to the data driver 120 and, at the same time, generates a data driving control signal DCC and a gate driving control signal GDC using horizontal/vertical synchronizing signals H and V in response to a clock signal CLK and supplies them to the data driver 120 and the gate driver 130, respectively. Herein, the data driving control signal DDC includes a source shift clock SSC, a source start pulse SSP, a polarity control signal POL and a source output enable signal SOE, etc. The gate driving control signal GDC includes a gate start pulse GSP and a gate output enable signal GOE, etc.

Figure 3:
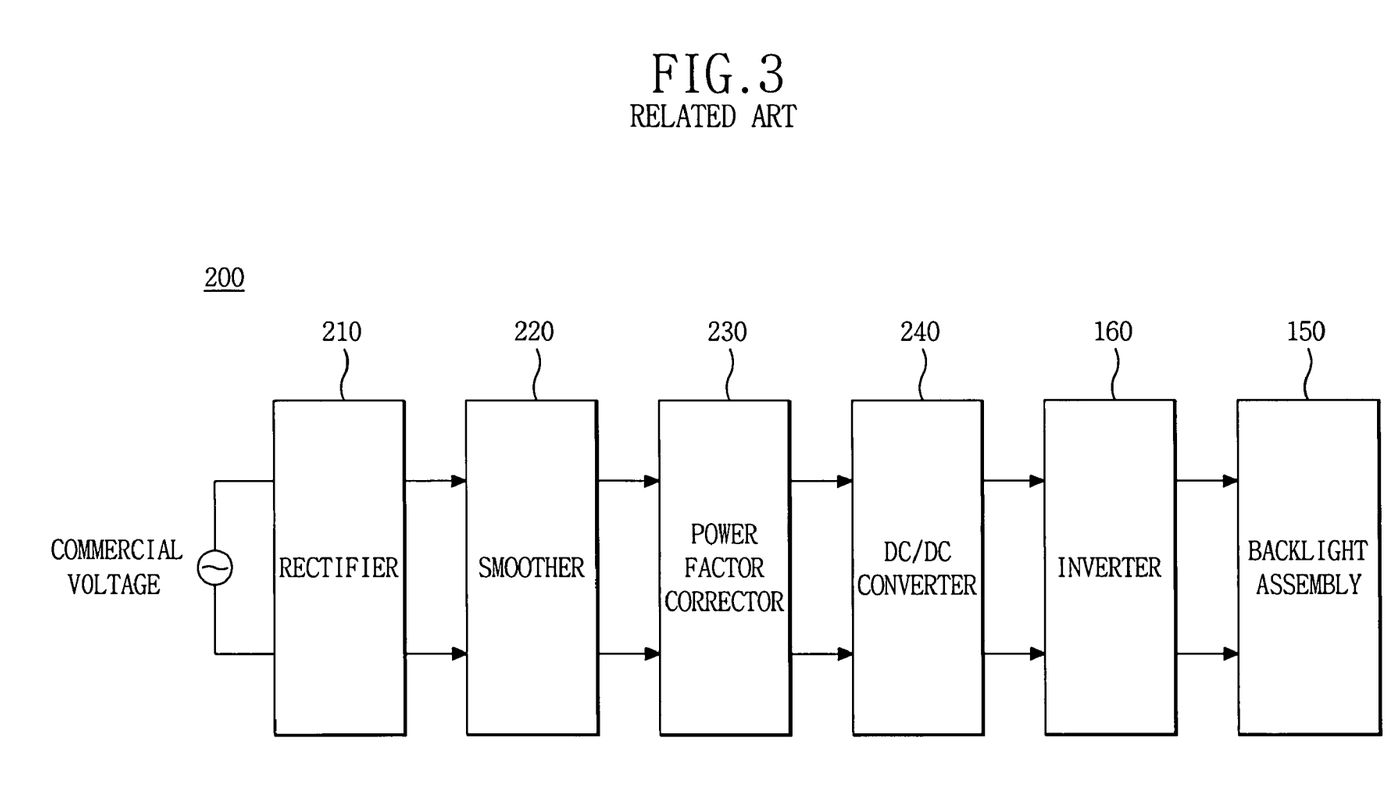
FIG. 3 is a block diagram showing a configuration of a backlight driving apparatus in the related art liquid crystal display device.

A related art backlight driving apparatus for driving a backlight of the liquid crystal display device having the above-mentioned configuration will be described with reference to FIG. 3 below. FIG. 3 shows a configuration of a backlight driving apparatus in the related art liquid crystal display device. Referring to FIG. 3, the backlight driving apparatus 200 includes a rectifier 210 for converting a commercial power voltage (e.g., alternating current (AC) voltage of 220V) into a direct current (DC) voltage, a smoother 220 for eliminating a ripple loaded on the DC voltage converted by the rectifier 210, a power factor corrector 230 for correcting a power factor of the DC voltage outputted from the smoother 220 and outputting a DC voltage of 400V, a DC/DC converter 240 for converting the DC voltage of 400V outputted from the power factor corrector 230 into a DC voltage of 24V to output it to the inverter 160, and an inverter 160 for converting and boosting the DC voltage of 24V inputted from the DC/DC converter 240 into an AC voltage of 1000 Vrms and supplying it to the backlight assembly 150.

Herein, the rectifier 210, the smoother 220, the power factor corrector 230 and the DC/DC converter 240 are provided at a power board (not shown) of a system such as a monitor, a television receiver or the like employing the liquid crystal display device 100 rather than at the liquid crystal display device 100. On the other hand, the inverter 160 is provided at the liquid crystal display device 100.

The related art backlight driving apparatus having the above-mentioned configuration has a problem in that it encounters an unnecessary power loss because the DC voltage of 400V outputted from the power factor corrector 230 is supplied to the inverter by way of the DC voltage conversion process made at the DC/DC converter 240 and in that it further reduces the voltage conversion efficiency because the inverter 160 converts and boosts the DC voltage of 24V into the AC voltage of 1000 Vrms.

Furthermore, the liquid crystal display device 100 provided with a hybrid backlight employs a boost converter to supply a driving voltage to a plurality of light emitting diodes (LEDs) (not shown). However, since such a boost converter has a deteriorated efficiency compared to a buck converter and requires many parts or elements, a driving efficiency of the plurality of LEDs is reduced and the manufacturing cost rises due to the need of many parts or elements.

SUMMARY OF THE INVENTION

Accordingly, it is a main object of the present invention to provide a hybrid backlight driving apparatus for a liquid crystal display wherein a high voltage can be converted into a driving voltage of a hybrid backlight to be supplied to lamps and light emitting diodes of the liquid crystal display.

Another object of the present invention is to provide a hybrid backlight driving apparatus for a liquid crystal display wherein a high voltage can be converted into a driving voltage of a hybrid backlight to thereby prevent an unnecessary power loss caused by a DC/DC converter, etc., and improve the conversion efficiency.

Yet another object of the present invention is to provide a hybrid backlight driving apparatus for a liquid crystal display wherein a high voltage can be converted into a driving voltage of a hybrid backlight without using a boost converter in supplying the converted voltage to light emitting diodes of the liquid crystal display device, thereby reducing the number of parts or elements as well as improving the driving efficiency.

In order to achieve these and other objects of the invention, a hybrid backlight driving apparatus for a liquid crystal display device according to an embodiment of the present invention for driving a backlight assembly is provided. The hybrid backlight assembly has a plurality of lamps and a plurality of light emitting diodes. The hybrid backlight driving apparatus includes: a lamp inverter for converting a first DC voltage into a lamp driving voltage and supplying the lamp driving voltage to the plurality of lamps; and a light emitting diode driver for converting the first DC voltage into a light emitting diode driving voltage and supplying the light emitting diode driving voltage to the plurality of light emitting diodes.

In another aspect of the present invention, as embodied, a display device includes a display panel; a hybrid backlight assembly for emitting light toward the display panel, the hybrid backlight assembly including a plurality of lamps and a plurality of light emitting diodes; a lamp inverter for converting a first DC voltage into a lamp driving voltage and supplying the lamp driving voltage to the plurality of lamps; and a light emitting diode driver for converting the first DC voltage into a light emitting diode driving voltage and supplying the light emitting diode driving voltage to the plurality of light emitting diodes.

In another aspect of the present invention, as embodied, a method of driving a hybrid backlight assembly of a display device is provided. The hybrid backlight assembly includes a plurality of lamps and a plurality of light emitting diodes. The method includes: converting a first DC voltage into a lamp driving voltage and supplying the lamp driving voltage to the plurality of lamps; and converting the first DC voltage into a light emitting diode driving voltage and supplying light emitting diode driving voltage to the plurality of light emitting diodes.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE ILLUSTRATED EMBODIMENTS

Figure 4:
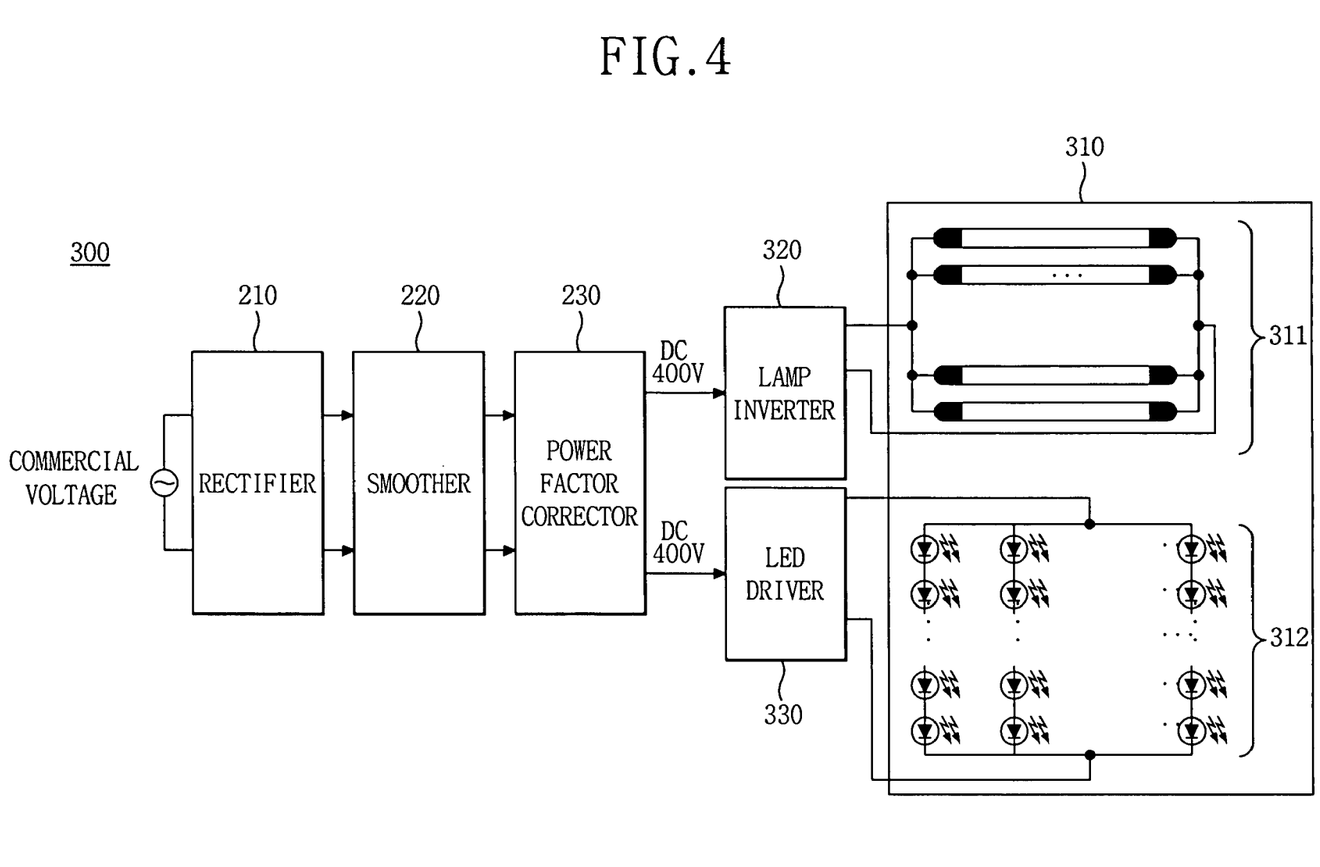
FIG. 4 is a block diagram showing a configuration of a backlight driving apparatus in a liquid crystal display device according to an embodiment of the present invention.

FIG. 4 shows a configuration of a backlight driving apparatus in a liquid crystal display device according to an embodiment of the present invention. The liquid crystal display device may further include conventional elements such as a liquid crystal display panel, a timing controller, a gate driving voltage generator, a data driver, a gate driver, a gamma reference voltage generator, a common voltage generator, etc.

Referring to FIG. 4, the backlight driving apparatus 300 includes a rectifier 210, a smoother 220 and a power factor corrector 230 similar to the backlight driving apparatus 200 shown in FIG. 3. Further, the backlight driving apparatus 300 includes a backlight assembly 310 including a plurality of lamps 311 and a plurality of light emitting diodes (LED's) 312, a lamp inverter 320 for converting a DC 400V applied from the power factor corrector 230 into a lamp driving voltage and supplying it to the lamps 311, and a light emitting diode driver 330 for converting the DC 400V applied from the power factor corrector 230 into a LED driving voltage and supplying it to the light emitting diodes 311.

The rectifier 210 converts a commercial power voltage (e.g., AC 220V or 110V, or other commercial power voltages) into a DC voltage and supplies it to the smoother 220. Since a voltage boosting is made in such a rectifying process, approximately DC 331V is supplied to the smoother 220 in the case of a commercial power voltage of AC 220V.

The smoother 220 eliminates a ripple loaded on a DC voltage (DC 331V) rectified by the rectifier 210 to apply the DC 331V having only a DC component to the power factor corrector 230. In this smoothing process, the smoother 220 only allows a DC component to pass, but absorbs and removes an AC component.

The power factor corrector 230 makes a power factor correction of the DC voltage (DC 331V) applied from the smoother 220 to eliminate a phase difference between the voltage and the current, and supplies the DC 400V to the lamp inverter 320 and the light emitting diode driver 330. Since the commercial power voltage used for each country is different, the power factor corrector 230 aims at supplying a constant DC voltage (DC 400V) to the lamp inverter 320 and the light emitting diode driver 330 irrespective of a magnitude of the commercial power voltage.

The backlight assembly 310 includes a plurality of lamps 311 arranged at the rear side of the liquid crystal display panel 110 to control the brightness of the picture field, and a plurality of light emitting diodes 312 spaced between the lamps at a constant distance to control the color of the picture field.

The lamp inverter 320 switches the DC high-level voltage (DC 400V) from the power factor corrector 230 to generate an AC voltage of 400 Vrms and thereafter boosts the AC 400 Vrms into an AC 750 Vrms and supplies it to each side of the lamps 311. In particular, the lamp inverter 320 supplies the AC 750 Vrms having opposite phases to both sides of the lamps 311, respectively.

The light emitting diode driver 330 converts the DC high-level voltage (DC 400V) from the power factor corrector 230 to a DC low-level voltage (DC 35V in the illustrated embodiment) to supply it to the light emitting diodes 312.

Figure 5:
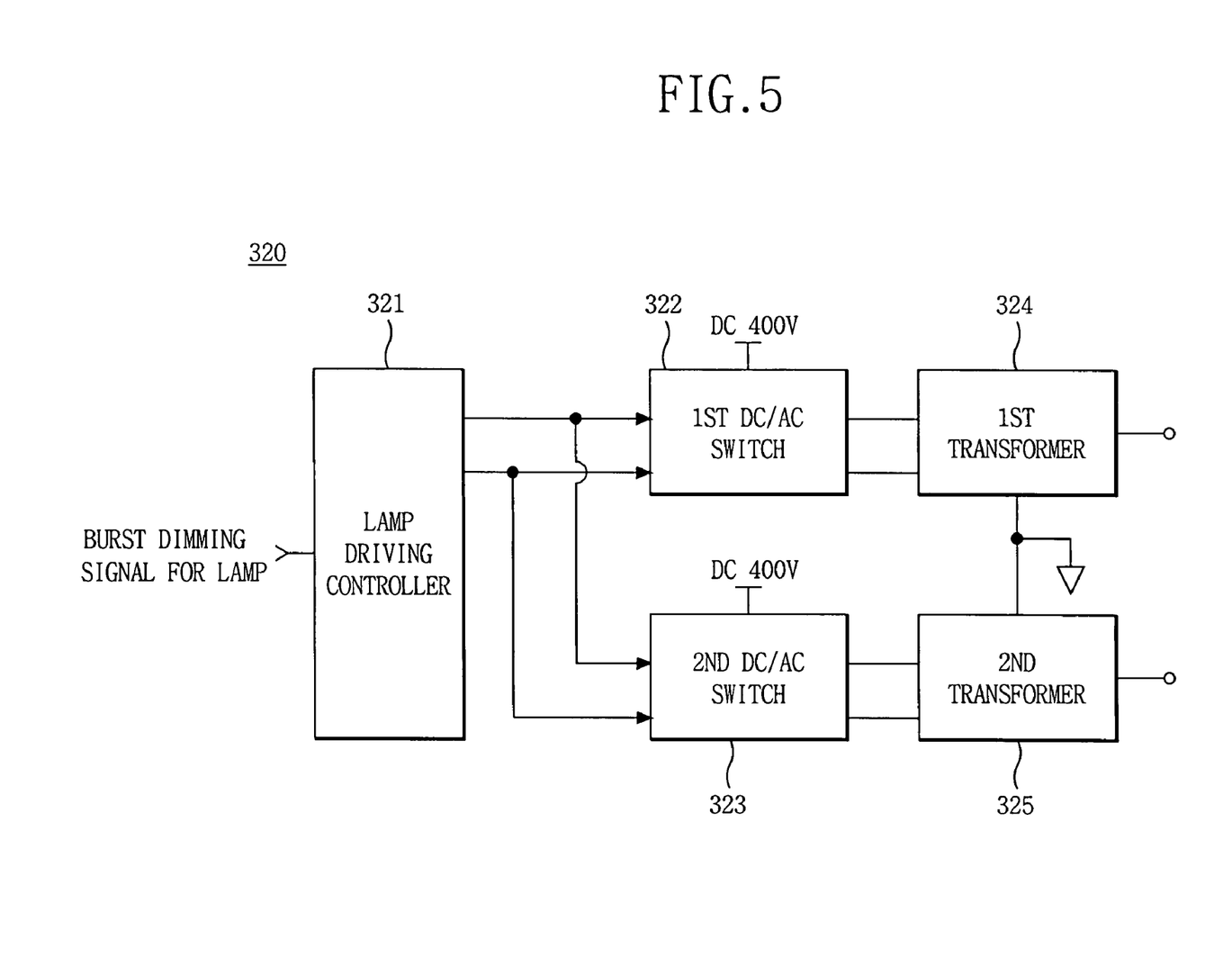
FIG. 5 is a block diagram showing a configuration of the lamp inverter in FIG. 4.

FIG. 5 shows a configuration of the lamp inverter in FIG. 4. Referring to FIG. 5, the lamp inverter 320 in the illustrated embodiment includes a lamp driving controller 321 for controlling driving of the lamps 311 in response to a burst dimming signal for the lamp, first and second DC/AC switching devices 322 and 323 for switching the DC high-level voltage (DC 400V in the illustrated embodiment) under control of the lamp driving controller 321 and outputting an AC voltage of 400 Vrms, a first transformer 324 for boosting the AC 400 Vrms outputted from the first DC/AC switching device 322 and supplying the boosted AC voltage (AC 750 Vrms in the illustrated embodiment) to one terminal of the lamps 311, and a second transformer 325 for boosting the AC 400 Vrms outputted from the second DC/AC switching device 323 and supplying an AC 750 Vrms having an phase opposite to the AC 750 Vrms outputted from the first transformer 324 to the other terminal of the lamps 311.

The lamp driving controller 321 generates a lamp driving control signal for controlling switching operations of the first and second DC/AC switching devices 322 and 323 in response to a burst dimming signal for the lamp, which is a pulse width modulated (PWM) signal, and supplies it to the first and second DC/AC switching devices 322 and 323. Herein, the burst dimming signal for the lamp is a typical signal for controlling brightness of the lamps 311.

The first DC/AC switching device 322 switches the DC high-level voltage (DC 400V) supplied from the power factor corrector 230 in response to the lamp driving control signal from the lamp driving controller 321 to output the AC voltage of 400 Vrms to the first transformer 324. In this case, the first DC/AC switching device 322 supplies a positive (+) AC 400 Vrms and a negative (−) AC 400 Vrms, via two signal paths, to the first transformer 324.

The second DC/AC switching device 323 switches the DC high-level voltage (DC 400V) fed from the power factor corrector 230 in response to a lamp driving control signal from the lamp driving controller 321 to output the AC voltage of 400 Vrms to the second transformer 324. In this case, the second DC/AC switching device 323 supplies a positive (+) AC 400 Vrms and a negative (−) AC 400 Vrms, via two signal paths, to the second transformer 324. Particularly, the first and second DC/AC switching devices 322 and 323 output AC 400 Vrms having the same phase.

The first transformer 324 boosts the inputted AC 400 Vrms, via two signal paths, from the first DC/AC switching device 322 and supplies the AC 750 Vrms to one terminal of the lamps 311.

The second transformer 325 boosts the inputted AC 400 Vrms, via two signal paths, from the second DC/AC switching device 323 and supplies the AC 750 Vrms to the other terminals of the lamps 311. In this case, the second transformer 325 supplies an AC 750 Vrms having a phase opposite to the AC 750 Vrms outputted from the first transformer 324.

A voltage of AC 750 Vrms is supplied to each terminal of the lamps 311 in this manner, so that a voltage of AC 1500 Vrms is substantially supplied to the lamps 311. Meanwhile, the illustrated hybrid backlight driving apparatus has been implemented such that the first and second transformers 324 and 325 supply the AC 750 Vrms to each terminal of the lamps 311, but is not limited to this implementation. A magnitude of a voltage supplied to the lamps may be changed in accordance with the type of the lamps or the number of the lamps.

Figure 6:
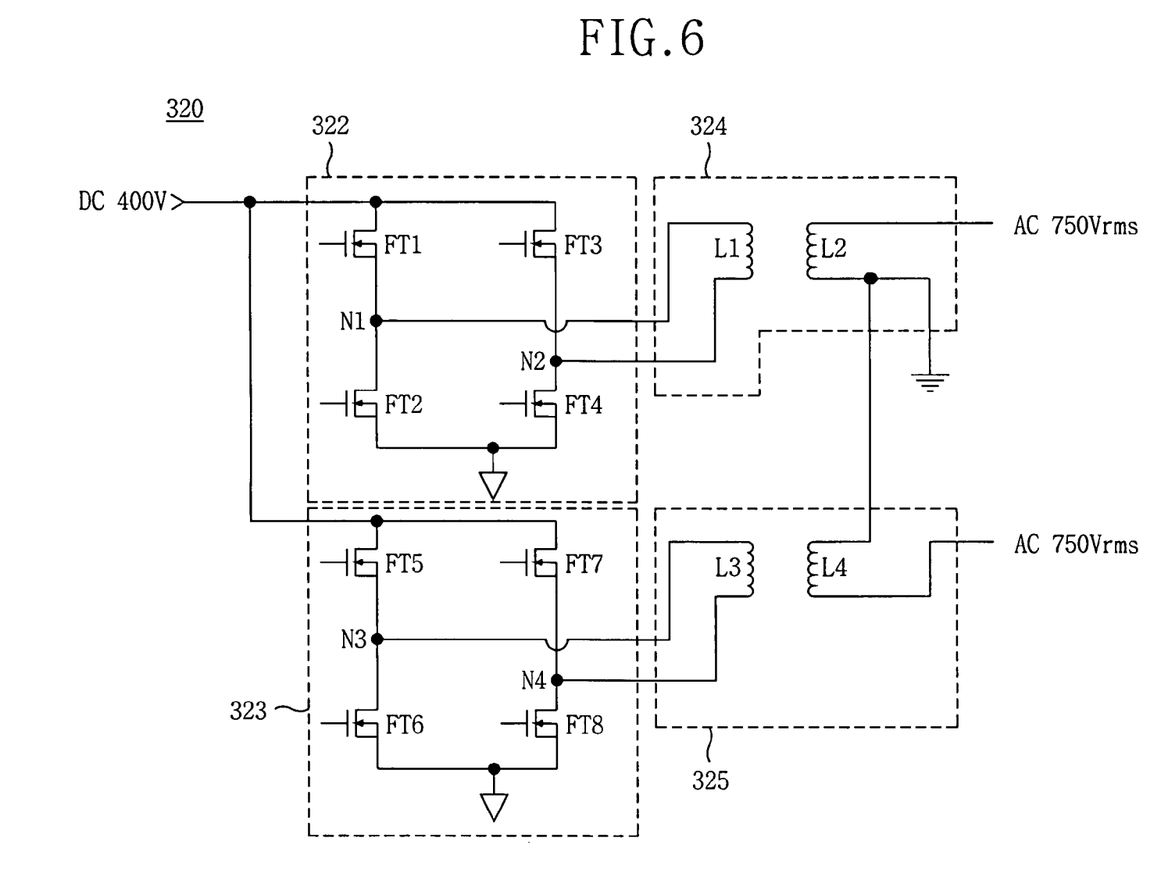
FIG. 6 is a circuit diagram of the lamp inverter shown in FIG. 4.

FIG. 6 is a circuit diagram of the lamp inverter shown in FIG. 4. Referring to FIG. 6, the first DC/AC switching device 322 in the illustrated embodiment includes first and second NMOS field effect transistors (FETs) FT1 and FT2 connected, in series, between an output terminal of the power factor corrector 230 and a ground, and third and fourth NMOS FETs FT3 and FT4 connected, in series, between the output terminal of the power factor 230 and the ground while being connected in parallel to and symmetrically to the first and second NMOS FETs FT1 and FT2.

The first NMOS FET FT1 has a drain to which the DC high-level voltage (DC 400V) from the power factor corrector 230 is applied, a gate to which the lamp driving control signal from the lamp driving controller 321 is applied, and a source connected to a first output node N1.

The second NMOS FET FT2 has a drain commonly connected to the source of the first NMOS FET FT1 and the first output node N1, a gate to which the lamp driving control signal from the lamp driving controller 321 is applied, and a source connected to the ground.

The third NMOS FET FT3 has a drain to which the DC high-level voltage (DC 400V) from the power factor corrector 230 is applied, a gate to which the lamp driving control signal from the lamp driving controller 321 is applied, and a source connected to a second output node N2.

The fourth NMOS FET FT4 has a drain commonly connected to the source of the third NMOS FET FT3 and the second output node N2, a gate to which the lamp driving control signal from the lamp driving controller 321 is applied, and a source connected to the ground. Herein, the first and second output nodes N1 and N2 are connected to the input terminal of the first transformer 324.

The second DC/AC switching device 323 in the illustrated embodiment includes fifth and sixth NMOS FETs FT5 and FT6 connected, in series, between the output terminal of the power factor corrector 230 and the ground, and seventh and eighth NMOS FETs FT7 and FT8 connected, in series, between the output terminal of the power factor corrector 230 and the ground, and connected in parallel to and symmetrically to the fifth and sixth NMOS FETs FT5 and FT6.

The fifth NMOS FET FT5 has a drain to which the high-level voltage (DC 400V) from the power factor corrector 230 is applied, a gate to which the lamp driving control signal from the lamp driving controller 321 is applied, and a source connected to a third output node N3.

The sixth NMOS FET FT6 has a drain commonly connected to the source of the fifth NMOS FET FT5 and the third output node N3, a gate to which the lamp driving control signal from the lamp driving controller 321 is applied, and a source connected to the ground.

The seventh NMOS FET FT7 has a drain to which the DC high-level voltage (DC 400V) from the power factor corrector 230 is applied, a gate to which the lamp driving control signal from the lamp driving controller 321 is applied, and a source connected to a fourth output node N4.

The eighth NMOS FET FT8 has a drain commonly connected to the source of the seventh NMOS FET FT7 and the fourth output node N4, a gate to which the lamp driving control signal from the lamp driving controller 321 is applied, and a source connected to the ground. Herein, the third and fourth output nodes N3 and N4 are connected to the input terminal of the second transformer 325.

The first transformer 324 includes a primary coil L1 having two terminals respectively connected to the first and second output nodes N1 and N2 of the first DC/AC switching device 322, and a secondary coil L2 having one terminal connected to one terminal of the lamps 311 and the other terminal connected to the ground.

The second transformer 325 includes a primary coil L3 having two terminals respectively connected to the third and fourth output nodes N3 and N4 of the second DC/AC switching device 323, and a secondary coil L4 having one terminal connected to one terminal of the lamps 311 and the other terminal connected to the ground.

Particularly, the coils L1 and L2 of the first transformer 324 and the coils L3 and L4 of the second transformer 325 are wound in an opposite direction with respect to each other. Thus, the AC 750 Vrms outputted from the first transformer 324 has an opposite phase contrary to the AC 750 Vrms outputted from the second transformer 325.

Figure 7:
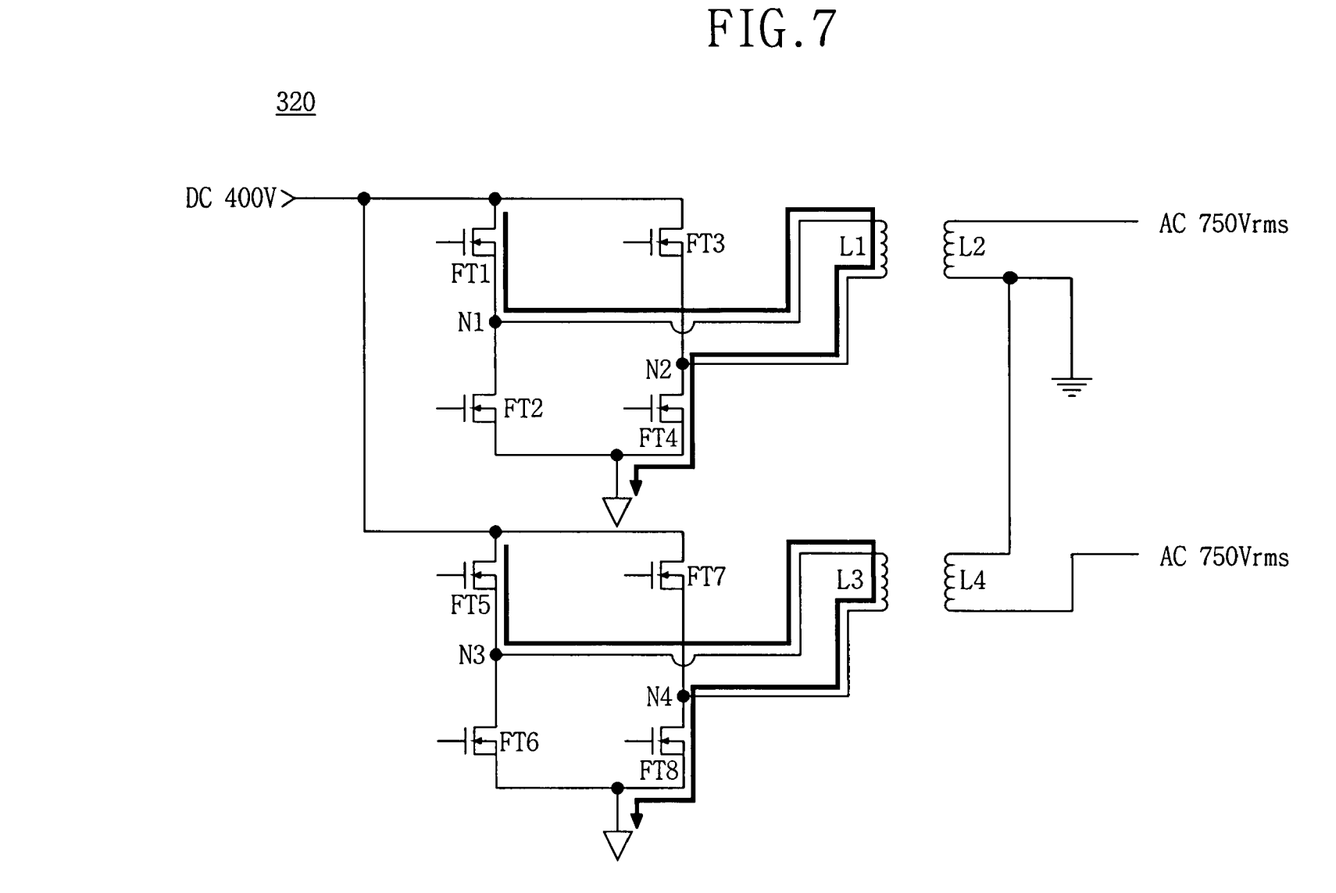
FIG. 7 and FIG. 8 illustrate operation procedures of the lamp inverter shown in FIG. 6.

An operation procedure of the lamp inverter 320 having the above-mentioned circuit configuration will be described in detail with reference to FIG. 7 to FIG. 9 below. As shown in FIG. 7, if the lamp driving controller 321 supplies a high-level lamp driving control signal to the gates of the first and fourth NMOS FETs FT1 and FT4 of the first DC/AC switching device 322 and to the gates of the fifth and eighth NMOS FETs FT5 and FT8 of the second DC/AC switching device 323, then the first and fourth NMOS FETs FT1 and FT4 and the fifth and eighth NMOS FETs FT5 and FT8 are turned on at the same time.

Accordingly, at the first DC/AC switching device 322, the DC high-level voltage (DC 400V) is switched by the first NMOS FET FT1 to be outputted, via the first output node N1, to the first transformer 324. Therefore, a path of a signal applied, via the first NMOS FET FT1, the first output node N1, the primary coil L1 of the first transformer 324, the second output node N2 and the fourth NMOS FET FT4 in turn, to the ground is formed.

Further, at the second DC/AC switching device 323, the DC high-level voltage (DC 400V) is switched by the fifth NMOS FET FT5 to be outputted, via the third output node N3, to the second transformer 325. Therefore, a path of a signal applied, via the fifth NMOS FET FT5, the third output node N3, the primary coil L3 of the second transformer 325, the fourth output node N4 and the eighth NMOS FET FT8 in turn, to the ground is formed.

Figure 8:
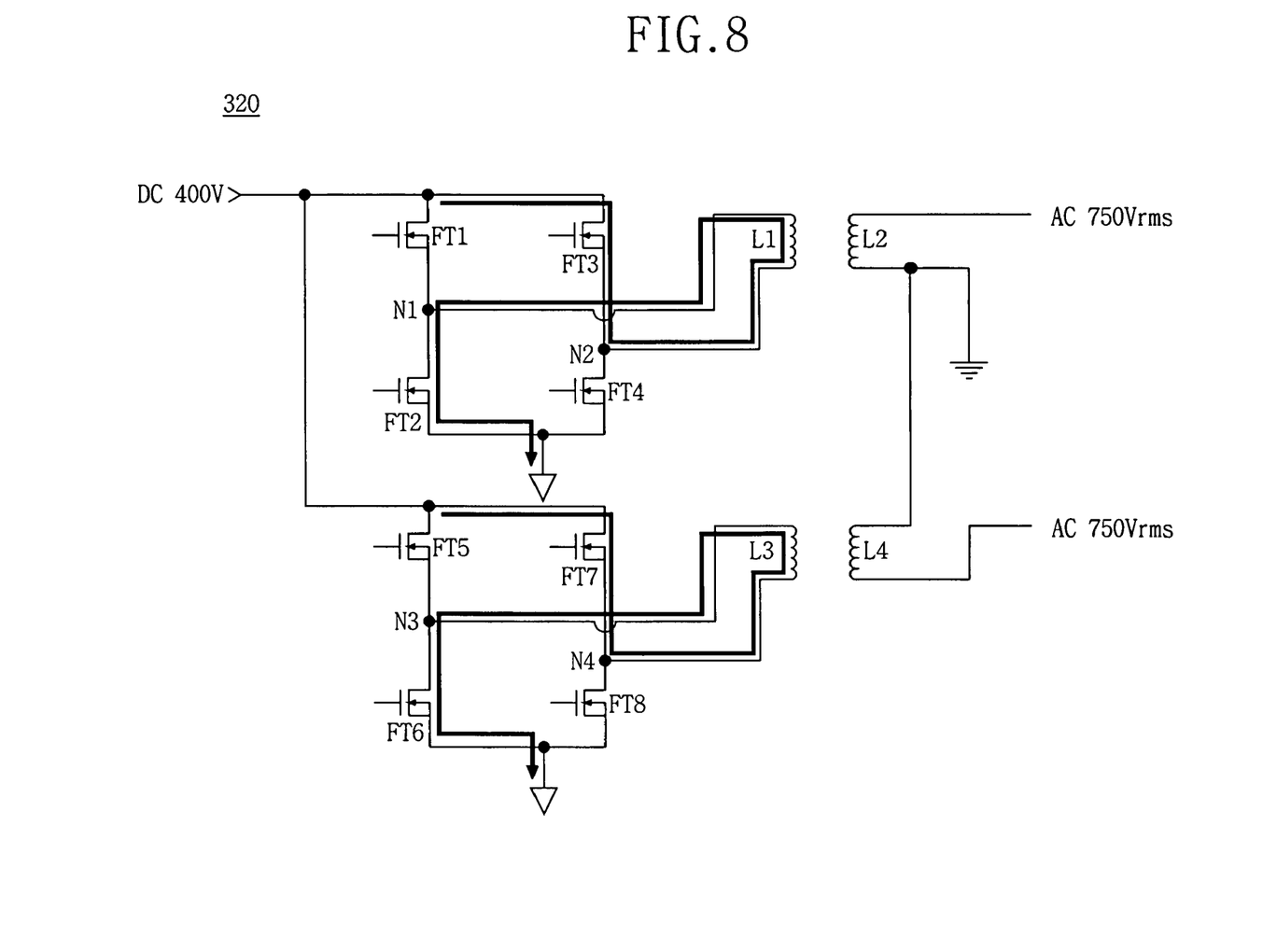
Figure 9:
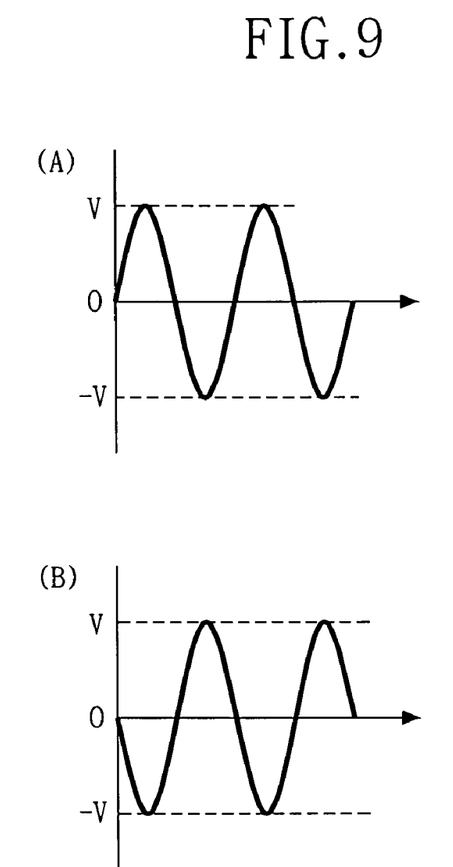
FIG. 9 shows an operational characteristic of the lamp inverter in FIG. 6.

As shown in FIG. 8, if the lamp driving controller 321 supplies a high-level lamp driving control signal to the gates of the second and third NMOS FETs FT2 and FT3 of the first DC/AC switching device 322 and to the gates of the sixth and seventh NMOS FETs FT6 and FT7 of the second DC/AC switching device 323, then the second and third NMOS FETs FT2 and FT3 and the sixth and seventh NMOS FETs FT6 and FT7 are turned on at the same time.

Accordingly, at the first DC/AC switching device 322, the DC high-level voltage (DC 400V) is switched by the third NMOS FET FT3 to be outputted, via the second output node N2, to the first transformer 324. Therefore, a path of a signal applied, via the third NMOS FET FT3, the second output node N2, the primary coil L1 of the first transformer 324, the first output node N1 and the second NMOS FET FT2 in turn, to the ground is formed.

Further, at the second DC/AC switching device 323, the DC high-level voltage (DC 400V) is switched by the seventh NMOS FET FT7 to be outputted, via the fourth output node N4, to the second transformer 325. At this time, a path of a signal applied, via the seventh NMOS FET FT7, the fourth output node N4, the primary coil L3 of the second transformer 325, the third output node N3 and the sixth NMOS FET FT6 in turn, to the ground is formed.

As described above, a signal path formed by way of the first and fourth MOS FETs FT1 and FT4 and a signal path formed by way of the second and third MOS FETs FT2 and FT3 in response to the lamp driving control signal is made in a direction opposite to each other. Therefore, as shown in FIG. 9 (A), the first DC/AC switching device 322 switches the DC high-level voltage in two directions in response to the lamp driving control signal to supply positive (+) and negative (−) AC 400 Vrms to each terminal of the primary coil L1 of the first transformer 324.

Further, a signal path formed by way of the fifth and eighth MOS FETs FT5 and FT8 and a signal path formed by way of the sixth and seventh MOS FETs FT6 and FT7 in response to the lamp driving control signal is made in a direction opposite to each other. Therefore, as shown in FIG. 9(B), the second DC/AC switching device 323 switches the DC high-level voltage in two directions in response to the lamp driving control signal to supply positive (+) and negative (−) AC 400 Vrms to each terminal of the primary coil L3 of the second transformer 325.

Moreover, the coils L1 and L2 of the first transformer 324 and the coils L3 and L4 of the second transformer 325 are wound in an opposite direction with respect to each other. Therefore, the AC 750 Vrms outputted from the first transformer 324 has a phase opposite to the AC 750 Vrms outputted from the second transformer 325 as shown in FIGS. 9A and 9B.

Figure 10:
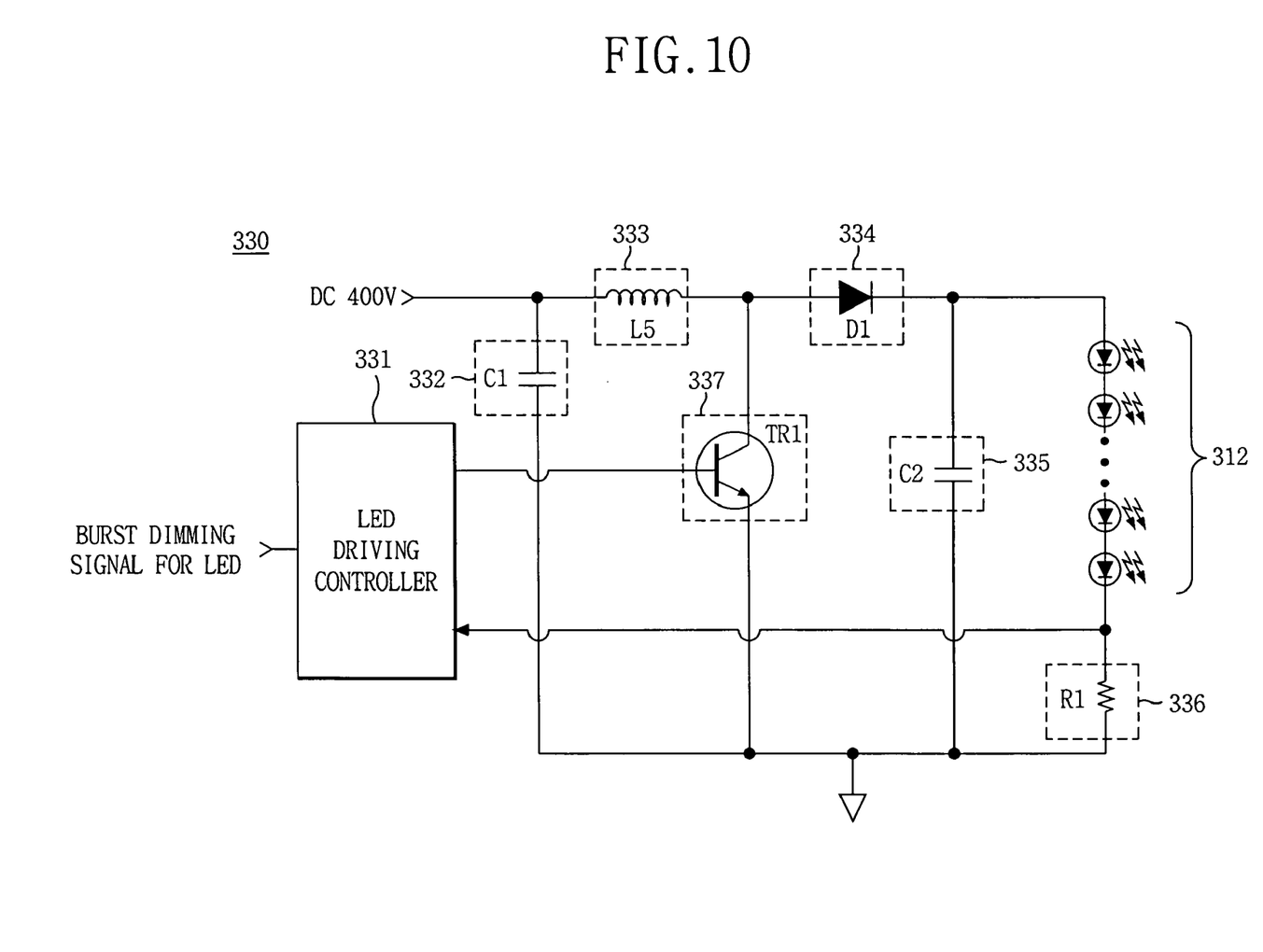
FIG. 10 is a circuit diagram of the light emitting diode driver shown in FIG. 4.

FIG. 10 is a circuit diagram of the light emitting diode driver shown in FIG. 4. Referring to FIG. 10, the light emitting diode driver 330 in the illustrated embodiment includes a light emitting diode driving controller 331 for controlling driving of the light emitting diodes 312 in response to a burst dimming signal for the light emitting diode, an input stabilizer 332 for stabilizing the DC high-level voltage (DC 400V) supplied from the power factor corrector 230, a DC/DC converter 333 for dropping the DC high-level voltage (DC 400V) supplied from the power factor corrector 230 to output a DC low-level voltage (DC 35V), a backward current preventing device 334 for preventing a reverse flowing of a current from the light emitting diodes 312, an output stabilizer 335 for stabilizing a voltage outputted from the DC/DC converter 333, a current sensor 336 for sensing a current flowing through the light emitting diodes 312 to feed back a voltage passing through the light emitting diodes 312 into the light emitting diode driving controller 331, and a switching device 337 for switching a DC low-level voltage (DC 35V) converted by the DC/DC converter 333 into the ground under control of the light emitting diode driving controller 331.

The light emitting diode driving controller 331 generates a light emitting diode driving control signal for controlling a switching operation of the switching device 337 in response to a burst dimming signal for the light emitting diode, which is a pulse width modulated (PWM) signal, and supplying it to the switching device 337. Herein, the burst dimming signal for the light emitting diode is a typical signal for controlling brightness of the light emitting diodes 312 to determine a color of the picture field.

The input stabilizer 332 in the illustrated embodiment includes a capacitor C1 connected between an input terminal thereof and the ground, and plays a role in stabilizing an input voltage by the capacitor C1.

The DC/DC converter 333 in the illustrated embodiment includes an inductor L5 having one terminal connected to the output terminal of the power factor corrector 230 and the other terminal commonly connected to the backward current preventing device 334 and the switching device 337, and plays a role in converting the DC high-level voltage (DC 400V) supplied from the power factor corrector 230 into a DC low-level voltage (DC 35V) by the inductor L5. However, the DC low-level voltage converted by the DC/DC converter 333 is not limited to the DC 35V, but is determined by the number of the light emitting diodes 312.

The backward current preventing device 334 in the illustrated embodiment includes a diode D1 having an anode commonly connected to the inductor L5 of the DC/DC converter 333 and the switching device 337 and a cathode commonly connected to one terminal of the light emitting diodes 312 and the output stabilizer 335, and plays a role in preventing a reverse flowing of a current from the light emitting diodes 312 by the diode D1.

The output stabilizer 335 in the illustrated embodiment includes a capacitor C2 having one terminal commonly connected to the cathode of the diode D1 of the backward current preventing means 334 and the anodes of the light emitting diodes 321 and the other terminal connected to the ground, and plays a role in stabilizing an output voltage by the capacitor C2.

The current sensor 336 in the illustrated embodiment includes a resistor R1 having one terminal commonly connected to the cathodes of the light emitting diodes 312 and a feedback terminal of the light emitting diode driving controller 331 and the other terminal connected to the ground. Herein, the resistor R1 senses a current flowing through itself and feeds a voltage loaded on each terminal thereof back into the light emitting diode driving controller 331. If a voltage is fed back, then the light emitting diode driving controller 331 controls a switching period of the switching device 337 in response to the feedback voltage to thereby supply a constant DC voltage to the light emitting diodes 312.

The switching device 337 in the illustrated embodiment includes a N-type bipolar transistor TR1 having a base for receiving a light emitting diode control signal from the light emitting diode driving controller 331, a collector commonly connected to the inductor L5 and the anode of the diode D1 and an emitter connected to the ground. In other words, the transistor TR1 is turned on when a high-level light emitting diode driving control signal is applied to the base thereof while being turned off when a low-level light emitting diode driving control signal is applied to the base thereof.

Figure 11:
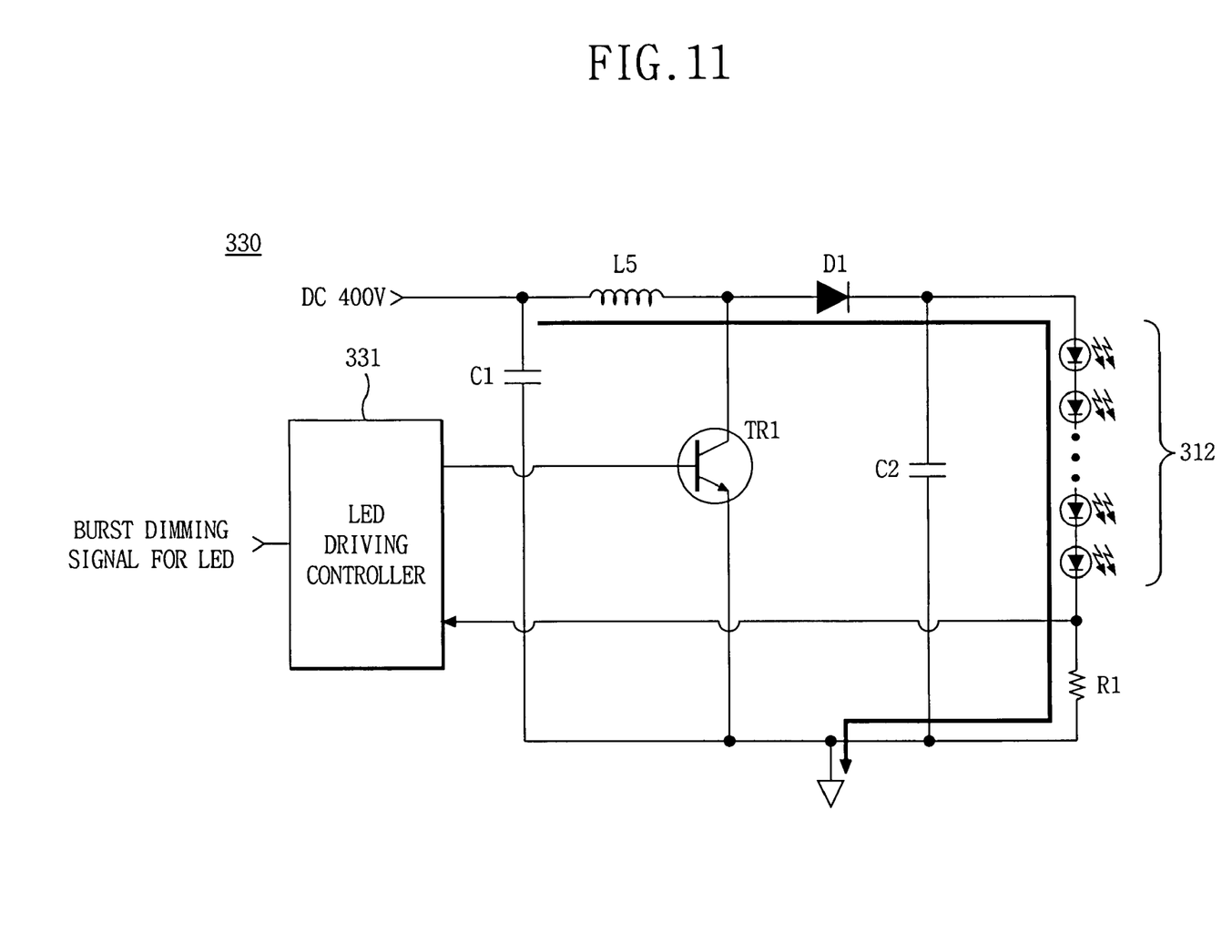
FIG. 11 and FIG. 12 illustrate operation procedures of the light emitting diode driver shown in FIG. 10.

An operation procedure of the light emitting diode driver 330 having the above-mentioned circuit configuration will be described in detail with reference to FIG. 11 and FIG. 12 below. If the light emitting diode driving controller 331 applies a low-level light emitting diode driving control signal to the base of the transistor TR1 of the switching device 337, then the transistor TR1 is turned off as shown in FIG. 11 to supply a DC low-level voltage (DC 35V) converted by the DC/DC converter 333 to the light emitting diodes 312, thereby radiating the light emitting diodes 312. Therefore, a path of a signal applied, via the inductor L5, the diode D1, the light emitting diodes 312 and the resistor R1 in turn, to the ground is formed.

Figure 12:
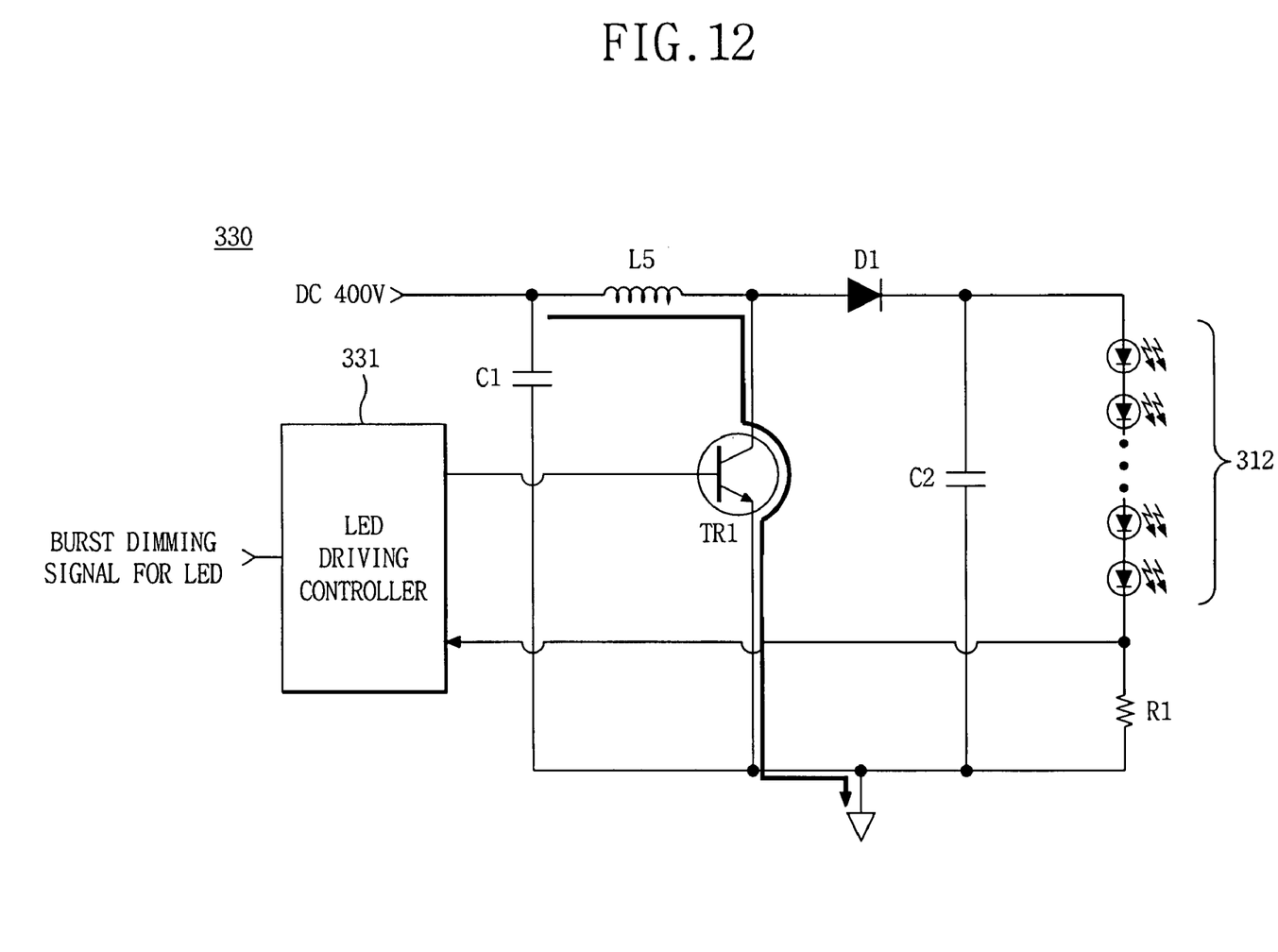

On the other hand, if the light emitting diode driving controller 331 applies a high-level light emitting diode driving control signal to the base of the transistor TR1 of the switching device 337, then the transistor TR1 is turned on as shown in FIG. 12 to supply a DC low-level voltage (DC 35V) converted by the DC/DC converter 333 to the ground, thereby turning off the light emitting diodes 312. Therefore, a path of a signal applied, via the inductor L5 and the transistor TR1 in turn, to the ground is formed.

As described above, the illustrated hybrid backlight driving apparatus can convert a high-level voltage into a driving voltage of the hybrid backlight to thereby prevent an unnecessary power loss caused by the DC/DC converter, etc., and improve the conversion efficiency. Furthermore, the illustrated hybrid backlight driving apparatus does not use the boost converter in converting a high-level voltage into a driving voltage of the hybrid backlight for the light emitting diodes of the liquid crystal display device. Therefore, it can reduce the number of parts or elements and enhance the driving efficiency.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A hybrid backlight driving apparatus for driving a hybrid backlight assembly of a liquid crystal display device, the hybrid backlight assembly having a plurality of lamps and a plurality of light emitting diodes, the hybrid backlight driving apparatus comprising:
    a lamp inverter for converting a first DC voltage into a lamp driving voltage and supplying the lamp driving voltage to the plurality of lamps; and
    a light emitting diode driver for converting the first DC voltage into a light emitting diode driving voltage and supplying the light emitting diode driving voltage to the plurality of light emitting diodes,
wherein the lamp inverter includes a lamp driving controller for controlling driving of the plurality of lamps in response to a burst dimming signal for the plurality of lamps, a first DC/AC switching device and a second DC/AC switching device for respectively converting the first DC voltage under control of the lamp driving controller to a first AC voltage and a second AC voltage, a first transformer for boosting the first AC voltage and supplying the boosted first AC voltage to a first terminal of each of the plurality of lamps and a second transformer for boosting the second AC voltage and supplying the boosted second AC voltage to a second terminal of each of the plurality of lamps, the boosted second AC voltage having a phase opposite to the boosted first AC voltage.

2. The hybrid backlight driving apparatus of claim 1, wherein the first and second transformers are wound in a direction opposite to each other.

3. The hybrid backlight driving apparatus of claim 1, wherein the light emitting diode driver includes:
    a light emitting diode driving controller for controlling driving of the plurality of light emitting diodes in response to a burst dimming signal for the plurality of light emitting diodes;
    a DC/DC converter for converting the first DC voltage to the light emitting diode driving voltage that is a second DC voltage lower than the first DC voltage; and
    a switching device for switching the light emitting diode driving voltage under control of the light emitting diode driving controller into a ground or to the plurality of light emitting diodes.

4. The hybrid backlight driving apparatus of claim 3, wherein the DC/DC converter includes an inductor.

5. The hybrid backlight driving apparatus of claim 3, wherein the switching device is turned off when a low-level light emitting diode driving control signal is applied from the light emitting diode driving controller to thereby supply the lamp driving voltage to the plurality of light emitting diodes, and wherein the switching device is turned on when a high-level light emitting diode driving control signal is applied from the light emitting diode driving controller, thereby switching the lamp driving voltage into the ground.

6. The hybrid backlight driving apparatus of claim 5, wherein the switching device includes:
    a transistor having a base to which the light emitting diode driving control signal is applied,
    a collector connected to an output terminal of the DC/DC converter, and
    an emitter connected to the ground.

7. The hybrid backlight driving apparatus of claim 3, wherein the light emitting diode driver further includes:
    an input stabilizer for stabilizing the first DC voltage received by the light emitting diode driver.

8. The hybrid backlight driving apparatus of claim 7, wherein the input stabilizer includes:
    a capacitor having a first terminal connected to the DC/DC converter and a second terminal connected to the ground.

9. The hybrid backlight driving apparatus of claim 3, wherein the light emitting diode driver further includes:
    an output stabilizer for stabilizing the lamp driving voltage.

10. The hybrid backlight driving apparatus of claim 9, wherein the output stabilizer includes:
    a capacitor connected in parallel to the plurality of light emitting diodes and connected between an output terminal of the DC/DC converter and the ground.

11. The hybrid backlight driving apparatus of claim 3, wherein the light emitting diode driver further includes:
    a backward current preventing device for preventing a reverse flowing of a current from the plurality of light emitting diode.

12. The hybrid backlight driving apparatus of claim 11, wherein the backward current preventing device includes:
    a diode having an anode connected to an output terminal of the DC/DC converter and a cathode connected to anodes of the plurality of light emitting diodes.

13. The hybrid backlight driving apparatus of claim 3, wherein the light emitting diode driver further includes:
    a current sensor for sensing a current flowing through the plurality of light emitting diodes and feeding a voltage applied to the current sensor back into the light emitting diode driving controller.

14. The hybrid backlight driving apparatus of claim 13, wherein the current sensor includes:
    a resistor having a first terminal commonly connected to cathodes of the plurality of light emitting diodes and to a feedback terminal of the light emitting diode driving controller, and
    a second terminal connected to the ground.

15. The hybrid backlight driving apparatus of claim 1, wherein the lamp driving voltage is an AC voltage, and the light emitting diode driving voltage is a second DC voltage lower than the first DC voltage.

16. The hybrid backlight driving apparatus of claim 1, further comprising a power factor corrector for providing the first DC voltage to the lamp inverter and the light emitting diode driver.

17. The hybrid backlight driving apparatus of claim 1, wherein the lamp inverter directly converts the first DC voltage into the lamp driving voltage that is an AC voltage.

18. The hybrid backlight driving apparatus of claim 17, wherein the lamp inverter directly converts the first DC voltage into the lamp driving voltage without using a DC/DC converter.

19. A display device comprising:
   a display panel;
   a hybrid backlight assembly for emitting light toward the display panel, the hybrid backlight assembly including a plurality of lamps and a plurality of light emitting diodes;
   a lamp inverter for converting a first DC voltage into a lamp driving voltage and supplying the lamp driving voltage to the plurality of lamps; and
   a light emitting diode driver for converting the first DC voltage into a light emitting diode driving voltage and supplying the light emitting diode driving voltage to the plurality of light emitting diodes,
   wherein the lamp inverter includes a lamp driving controller for controlling driving of the plurality of lamps in response to a burst dimming signal for the plurality of lamps, a first DC/AC switching device and a second DC/AC switching device for respectively converting the first DC voltage under control of the lamp driving controller to a first AC voltage and a second AC voltage, a first transformer for boosting the first AC voltage and supplying the boosted first AC voltage to a first terminal of each of the plurality of lamps and a second transformer for boosting the second AC voltage and supplying the boosted second AC voltage to a second terminal of each of the plurality of lamps, the boosted second AC voltage having a phase opposite to the boosted first AC voltage.

20. The display device of claim 19, wherein the display panel is a liquid crystal panel.

21. The display device of claim 19, wherein the lamp driving voltage is an AC voltage, and the light emitting diode driving voltage is a second DC voltage lower than the first DC voltage.

22. The display device of claim 19, wherein the lamp inverter directly converts the first DC voltage into the lamp driving voltage that is an AC voltage.

23. The display device of claim 22, wherein the lamp inverter directly converts the first DC voltage into the lamp driving voltage without using a DC/DC converter.

24. The display device of claim 19, wherein the light emitting diode driver includes:
   a light emitting diode driving controller for controlling driving of the plurality of light emitting diodes in response to a burst dimming signal for the plurality of light emitting diodes; a DC/DC converter for converting the first DC voltage to the light emitting diode driving voltage that is a second DC voltage lower than the first DC voltage; and
   a switching device for switching the light emitting diode driving voltage under control of the light emitting diode driving controller into a ground or to the plurality of light emitting diodes.

25. A method of driving a hybrid backlight assembly of a display device, the hybrid backlight assembly having a plurality of lamps and a plurality of light emitting diodes, the method comprising:
   converting a first DC voltage into a lamp driving voltage and supplying the lamp driving voltage to the plurality of lamps; and
   converting the first DC voltage into a light emitting diode driving voltage and supplying light emitting diode driving voltage to the plurality of light emitting diodes,
   wherein the step of converting the first DC voltage into the lamp driving voltage includes converting the first DC voltage to an AC voltage, boosting the first AC voltage to be a first boosted AC voltage and supplying the first boosted AC voltage to a first terminal of each of the plurality of lamps and boosting the first AC voltage to be a second boosted AC voltage and supplying the second boosted AC voltage to a second terminal of each of the plurality of lamps, the second boosted AC voltage having a phase opposite to the first boosted AC voltage.

26. The method of claim 25, wherein the lamp driving voltage is an AC voltage, and the light emitting diode driving voltage is a second DC voltage lower than the first DC voltage.

27. The method of claim 25, wherein the step of converting the first DC voltage into the lamp driving voltage includes directly converting the first DC voltage into the lamp driving voltage that is an AC voltage.

28. The method of claim 27, wherein the step of directly converting the first DC voltage into the lamp driving voltage is performed without a DC/DC conversion.

29. The method of claim 25, wherein the step of converting the first DC voltage into the light emitting diode driving voltage includes:
   converting the first DC voltage to the light emitting diode driving voltage that is a second DC voltage lower than the first DC voltage; and
   selectively switching the light emitting diode driving voltage to a ground or to the plurality of light emitting diodes.

* * * * *